United States Patent [19]

Honsa

[11] 3,726,489

[45] Apr. 10, 1973

[54] SINGLE-FLANGE TAPE REEL

[75] Inventor: Horst L. A. Honsa, Decatur, Ala.

[73] Assignee: S.C.I. Systems, Inc., Huntsville, Ala.

[22] Filed: June 28, 1971

[21] Appl. No.: 157,312

[52] U.S. Cl. ....................242/71.8
[51] Int. Cl. ....................B65h 75/12
[58] Field of Search ....................242/71.8, 71.8 A, 242/55.19 A, 118

[56] References Cited

UNITED STATES PATENTS

| | | | |
|---|---|---|---|
| 3,617,010 | 11/1971 | Coy | 242/71.8 |
| 3,203,637 | 8/1965 | Kaiser | 242/71.8 A |
| 1,823,245 | 9/1931 | Wittel | 242/71.8 A |
| 2,974,892 | 3/1961 | Geloso | 242/71.8 A |

*Primary Examiner*—George F. Mautz
*Assistant Examiner*—Edward J. McCarthy
*Attorney*—Curtis, Morris & Safford

[57] ABSTRACT

The tape reel is molded out of a thermoplastic synthetic resin such as polystyrene. The reel has a flange and an integral hub which extends from one side of the flange. There are cavities which form radial ribs in the hub on the opposite wide of the flange. This provides a maximum amount of solid plastic material to support tape tightly wound on the hub, while preventing molding distortion of the hub, and at the same time minimizing fabrication costs.

10 Claims, 5 Drawing Figures

INVENTOR.
HORST L. A. HONSA
BY
Curtis, Morris & Safford
ATTORNEYS

SINGLE-FLANGE TAPE REEL

This invention relates to reels, and particularly to single-flange reels for storing magnetic tape or the like.

Single-flange tape reels have been proposed in the past for the purpose of storing tightly-wound magnetic tape as it comes from the tape manufacturing line. However, such prior tape reels either have been more expensive than desired, or, if satisfactorily inexpensive, have not been strong enough to support the tremendous forces created by the tightly wound roll of tape.

Accordingly, it is an object of the present invention to make a relatively quite inexpensive, yet structural stable single-flanged tape reel.

In accordance with the present invention, this object is met by the provision of a single-flange tape reel having an integral hub and flange, with the hub extending outwardly from one side of the flange, and a plurality of cavities on the opposite side. The cavities preferably are shaped so as to form radial ribs. This structure preferably is molded from a thermoplastic synthetic resin such as polystyrene. The reel has the advantage that a maximum amount of solid plastic material is positioned directly beneath the tape-supporting surface, and yet the maximum thickness of the hub is not so great that distortions are caused during the molding process and molding time is not made inordinately long. Thus, the tape reel can be produced quite inexpensively.

The foregoing and other objects and advantages of the invention will be described in or apparent from the following description and drawings. In the drawings.

Figure 1:
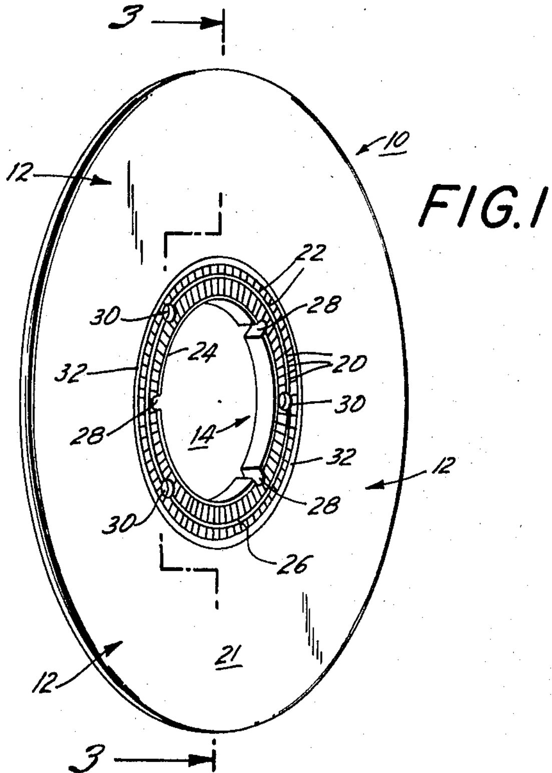
FIG. 1 is a perspective view of the tape reel of the present invention.

FIG. 1 shows a tape reel 10 with what usually is considered its rear surface facing forward. The reel 10 includes a flange 12 and a hub 14. The hub and flange are integrally molded in one piece out of a suitable plastic material, preferably a thermoplastic synthetic resin such as general purpose polystyrene, styreneacrylinitrile (SAN) or a similar material.

Figure 3:
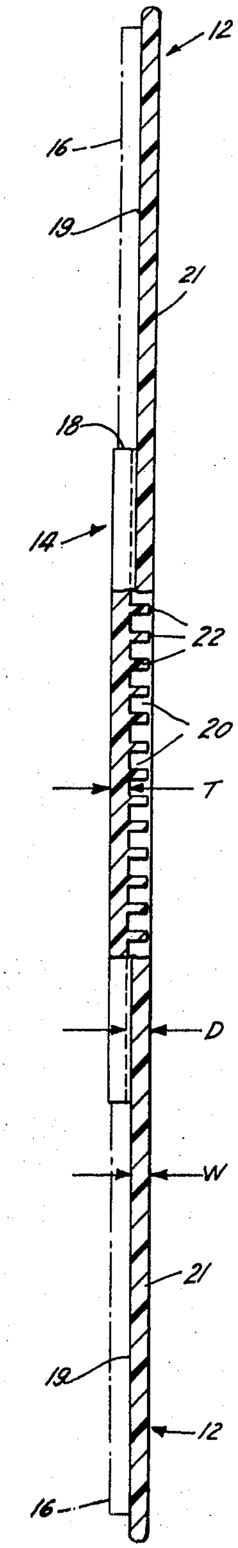
FIG. 3 is an enlarged cross-sectional view taken along lines 3—3 of FIG. 1.

FIG. 3 shows the portion which extends outwardly from the front surface 19 of the flange 12. This extended portion forms a tape-receiving cylindrical surface 18. Tape is wound tightly upon the surface 18, usually under moderate tension. However, many layers of the thin tape are wound on the hub so that when the reel is full, a very large crushing force is applied to the hub. The outlines of the tape when wound on the hub are indicated by the dashed lines 16.

Figure 2:
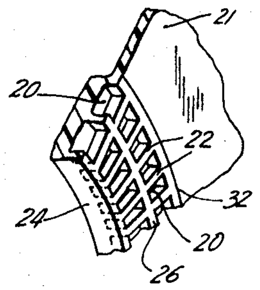
FIG. 2 is an enlarged section of a portion of the hub of the tape reel shown in FIG. 1.

The hub has a plurality of cavities 20 (see FIGS. 1 through 3), in the rear surface of the tape reel. The cavities 20 are shaped so that radial ribs 22 are formed, as well as three circumferential ribs 24, 26 and 32.

Also formed are three notches 28 spaced angularly approximately 120° from one another, and three similarly-spaced holes 30 which extend part of the way into the hub 14. The holes 30 and the notches 28 are provided in order to secure the reel onto a drive shaft during the winding and/or unwinding process.

FIG. 3 shows that the majority of the material underneath the wound tape roll 16 is solid plastic. This provides maximum strength in the region of the hub which receives the most stress. Nonetheless, the tape reel can be molded relatively rapidly so that its manufacturing costs can be kept very low, and deleterious distortion of the tape supporting surface 18 of the hub is avoided.

The relationships between the various dimensions of the tape reel should be determined with care. Referring to FIG. 3, it is preferred that the depth D of the cavities 20 be somewhat greater than the thickness T of the solid portion of the hub. A ratio of D/T of 1.2 has been found to be satisfactory. Also, it has been found that the thickness of the ribs 22 should be somewhat less than that of the surfaces to which they are perpendicular; namely, the circumferential ribs 24, 26 and 32. The thickness W of the flange 12 is not particularly critical. However, its thickness should be of the same order of magnitude as the thickness of the other parts so that the molding time for various parts will be similar.

Figure 4:
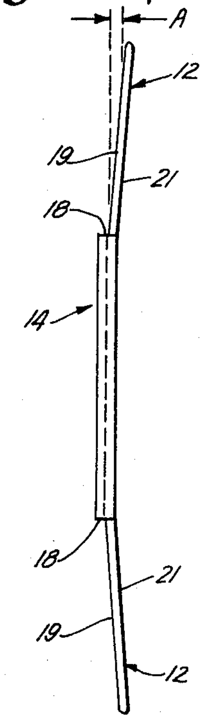
FIG. 4 is an elevation view of another embodiment of the invention.
Figure 5:
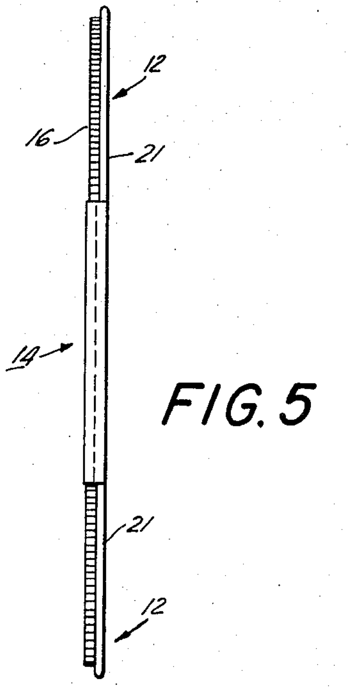
FIG. 5 is an elevation view of the tape reel shown in FIG. 4 with tape wound upon it.

Another embodiment of the invention is shown in FIGS. 4 and 5. The tape reel shown in those figures is the same as that shown in FIGS. 1 through 3 except that the flange 12 is canted towards the rear surface of the tape reel. The purpose of this canting is to provide compensation for cold deformation or so-called "-creep" of the plastic material, especially when tape is wound with more than the usual tension and is stored for considerable length of time on the tape reel. Such creep can cause the flange 12 to bend forwardly and distort the tape roll. However, the canting of the flange compensates for this and prevents the distortion problem.

The amount of canting is indicated in FIG. 4 by the dimension A, which is the distance of deviation of the flange from perpendicularity with the longitudinal axis of the hub 14. The measurement is taken at a distance of one-half inch from the outer edge of the flange 12. It has been found that the dimension A should be made between 0.005 inch and 0.020 inch for a 10½ inch diameter flange.

FIG. 5 shows the tape reel of FIG. 4 with the roll of tape 16 in place and shows the flange 12 in the vertical position to which it has moved under the extraordinary stresses placed upon it as mentioned above.

Following is a specific example of a tape reel which has been constructed and successfully tested in accordance with the present invention. This tape reel was molded out of general purpose polystyrene, and has the following dimensions:

The flange diameter is 10½ inches.

The hub outside diameter is 4½ inches.

The hub solid thickness T is 0.125 inch.

The cavity depth D is 0.150 inch.

The overall thickness from the front surface of the hub to the back surface 21 of the flange 12 is 0.275 inches.

The flange thickness W is 0.110 inch.

The distance from the front 19 of the flange to the front of the hub 14 is 0.165 inch.

The thickness of the radial ribs 22 is 0.062 inch.

The thickness of the circumferential ribs 24, 26 and 28 is 0.080 inch.

The tape reel is specifically designed to accept rolls of magnetic tape 0.150 inch in width. Such tape is widely used in sound recording.

The above description of the invention is intended to be illustrative and not limiting. Various changes or modifications in the embodiments described may occur to those skilled in the art and these can be made without departing from the spirit or scope of the invention.

I claim:

1. A single-flange tape reel comprising an integral hub and flange, said hub extending outwardly from one side of said flange, said hub having a radial width which is substantially larger than its thickness, and a plurality of cavities forming radial ribs extending substantially the full radial width of said hub in said hub on the side opposite said one side of said flange, the outwardly-extending portion of said hub being substantially solid.

2. A tape reel as in claim 1 in which the depth of said cavities is at least equal to one-half of the thickness of said hub.

3. A tape reel as in claim 2 in which the depth of said cavities is greater than one-half of the thickness of said hub.

4. A tape reel as in claim 1 in which said reel is made of a thermoplastic synthetic resin.

5. A reel as in claim 4 in which said resin is polystyrene.

6. A reel as in claim 1 in which said flange is inclined with respect to the longitudinal axis of said hub, the angle between said axis and said one side of said flange being greater than 90°.

7. A single-flange tape reel, said reel comprising an integral hub and flange, said hub extending outwardly from one surface of said flange to form a tape-receiving surface, said hub having a substantial radial thickness, the portion of said hub which extends outwardly from said one flange surface being substantially solid, and a plurality of cavities forming radial ribs and a plurality of circumferential ribs extending transversely of and interconnecting said radial ribs in said hub on the side of said flange opposite said one side.

8. A reel as in claim 7 in which said reel is made of a thermoplastic synthetic resin.

9. A reel as in claim 7 in which the thickness of said radial ribs is less than that of said circumferential ribs.

10. A reel as in claim 7 in which there are three of said circumferential ribs, one of the radially innermost surface of said hub, one adjacent the radially outermost surface of said hub, and one intermediate said innermost and outermost surfaces.

* * * * *